United States Patent [19]
Snyder

[11] 4,074,688
[45] Feb. 21, 1978

[54] PILOT VALVE
[75] Inventor: David E. Snyder, Longview, Tex.
[73] Assignee: U. S. Industries, Inc., New York, N.Y.
[21] Appl. No.: 799,214
[22] Filed: May 23, 1977

Related U.S. Application Data
[62] Division of Ser. No. 663,272, March 3, 1976.
[51] Int. Cl.² ............................................. F16K 17/00
[52] U.S. Cl. .............................. 137/269; 137/625.66; 251/63.4; 251/63.6
[58] Field of Search ............... 137/269, 456, 458, 461, 137/625.66; 251/62, 63, 63.4, 63.5, 63.6

[56] References Cited
U.S. PATENT DOCUMENTS

| | | | |
|---|---|---|---|
| 3,746,047 | 7/1973 | Peters | 137/625.66 |
| 3,863,672 | 2/1975 | Theriot et al. | 137/458 X |
| 3,963,050 | 6/1976 | Theriot et al. | 137/625.66 |

Primary Examiner—Alan Cohan
Assistant Examiner—Gerald A. Michalsky

[57] ABSTRACT

There is disclosed a valve having a valving element longitudinally reciprocable within a bore in the body of the valve between alternate positions for controlling the flow of a first fluid between lateral ports connecting with the bore. A piston connected to one end of the valving element is urged in a direction to move the valving element to one position by a force due to the pressure of a second fluid acting over the piston, and a stem on the other end extends through the valve body to provide an externally accessible part which may be manipulated to shift the valving element between its alternate positions. Means are provided for holding the valving element in its one position, automatically in response to manipulation of the stem to shift it into that position and irrespective of the pressure of the second fluid acting over the piston.

1 Claim, 7 Drawing Figures

PILOT VALVE

This is a division of application Ser. No. 663,272, filed on Mar. 3, 1976 by David E. Snyder and entitled "Valve".

This invention relates generally to valves of the type which have a valving element longitudinally reciprocable within a bore in the bore of the body of the valve between alternate positions for controlling the flow of a first fluid between lateral ports connecting with the bore. More particularly, it relates to improvements in valves of this type in which a piston connected to one end of the valving element is urged in a direction to move the valving element to one of its positions by a force due to the pressure of a second fluid acting over the piston, whereby the valving element is caused to move between its alternate positions in response to changes in the pressure of the second fluid, and a stem on the other end of the valving element extends through the valve body to provide an externally accessible port which may be manipulated to move the valving element between its alternate positions.

In the system disclosed in U.S. Pat. No. 3,043,331 for use in causing a safety valve to close a flowline in response to changes in the pressure of the fluid within the flowline, pilot valves are installed between a diaphragm type operator for the safety valve and the source of a first fluid to be used in controlling the operator. The spool of each such pilot valve is caused to shift from a first position, in which it admits the first fluid to the operator in order to hold the safety valve open, to a second position, in which it vents the first fluid from the operator in order to permit the safety valve to close, in response to the rise or fall of a second fluid in the flowline above or below predetermined levels.

Although not disclosed in such patent, the system may also include one or more valves of the type contemplated by the present invention. For example, one such valve may be installed in the conduit connecting the pilot valves and the safety valve operator for the purpose of causing the safety valve to close in the event the first fluid is lost or otherwise drops below a predetermined level. Thus, the valve is caused to reciprocate between a first position for admitting the first fluid as long as the pressure of the second fluid, which is from the same source as the first fluid, is above a predetermined level, and a second position venting such fluid when its pressure drops below that level.

Alternately, a valve of the type contemplated by this invention may be installed in a system similar to that shown in U.S. Pat. No. 3,877,484. In a system of this latter type, the first and second fluids are from different sources.

The stem of the valve shown in U.S. Pat. No. 3,877,484 permits the valving element to be manually shifted into either of its positions, which may be necessary or at least desirable for a number of reasons, without the necessity of externally manipulatable latches or the like. However, when shifted to its first position, the valving element will not remain in that position unless the pressure of the second fluid acting over the piston is above a predetermined level. There are occasions in which it might be convenient if not necessary to permit the valving element to be held in its first position irrespective of the pressure of the fluid acting over such position, as, for example, when a number of such valves are to be reset in their first positions before the system in which they are installed is restored to operation.

The piston of the valve shown in U.S. Pat. No. 3,877,484 is also of such construction that once the valving element has been moved to its second position, it can be returned to its first position only by manipulation of the stem. Although this is often a desirable precaution in order to prevent inadvertent return of the valving element to its first position, there are occasions in which it might be desirable to permit the valving element to be so returned automatically in response to a rise in fluid pressure on the piston above the above-mentioned predetermined level.

An object of this invention is to provide a valve of this type having a valving element which may be shifted into its first position and then held in that position without the need for externally manipulatable latching elements or detents, and irrespective of the pressure of the fluid acting on the piston.

Another object is to provide such a valve in which a rise in the pressure acting over the piston above the predetermined level automatically releases the valving element from its first position for return to its second position automatically in response to a drop in the pressure of fluid below such level.

A further object is to provide such a valve in which the valving element may be so released and returned by manipulation of the stem to shift the valving element back to its second position.

Yet another object is to provide a valve in which the valving element may be released from its first position and returned to its second position in either of the ways described in the foregoing objects – i.e., either automatically or by manipulation of the stem.

Still another object is to provide a valve which is capable of accomplishing one or more of the foregoing objects, but which is nevertheless of relatively simple and inexpensive construction.

A still further object is to provide such a valve in which a simple field adjustment permits the valving element to be moved from its second to its first position not only by manipulation of the stem, but also automatically in response to the rise in the pressure of fluid acting over the piston above its predetermined level.

These and other objects are accomplished, in accordance with the illustrated embodiment of the present invention, by a valve of the type described in which the valving element and piston are provided with releasable locking means which connect them for longitudinal movement with one another when both are in their second positions, and which are released automatically in response to manipulation of the stem to shift the valving element from its second to its first position, whereby the piston is free to return to its second position. Means are further provided for locking the valving element in its first position automatically in response to release of the first mentioned locking means, and for releasing the second mentioned locking means to permit the valving element to be moved back to its second position so that, with the piston in its second position, the valving element and piston are relocked for longitudinal movement with one another.

The means for releasing the last mentioned locking means includes means automatically responsive to movement of the piston toward its first position due to a rise in the pressure of the second fluid above the predetermined level, as well as means automatically responsive to manipulation of the stem to shift the valving element toward its second position. Thus, the valving element and piston may be moved back to locked positions without manipulation of the stem, and alternatively, whether or not the pressure of the second fluid rises above the predetermined level.

Yieldable means such as coil springs are arranged to maintain each of the piston and valving element in its second position, and thus in position to vent the first fluid, despite the force due to the second fluid acting over the piston to urge it to its first position. The springs also serve to return the piston to its second position when the valving element has been shifted to its first position, and then to return the valving element to its second position when the means by which it is locked in its first position is released.

In the preferred and illustrated embodiment of the invention, an inner part of the piston fits within an outer part on the valving element when the valving element and piston are in their second position. The inner part has a first retaining wall with a first locking shoulder at one end of the wall, a means within the body provides a second retaining wall disposed about the outer part and a second shoulder at one end of the second wall facing oppositely to the first shoulder, and detents are carried by the outer part for lateral shifting between engagement with one or the other of the locking shoulders. When the second retaining wall is opposite the detents, and the valving element and piston are in their second positions, the second wall holds them in locking engagement with the first shoulder to thereby lock the valving element and piston for longitudinal movement with one another. Then, upon manipulation of the stem to shift the valving element from its second to its first position, the detents are disposed opposite the second shoulder so as to release them from locking engagement with the first shoulder, whereby movement of the piston toward its first position causes the first shoulder to force the detents into locking engagement with the second shoulder and then move the first retaining wall into a position opposite the detents to hold them in locking engagement with the second shoulder, so as to lock the valving element in its first position.

On the other hand, in the event the piston is moved back toward its second position, as for example when the pressure of the second fluid rises above a predetermined level, the first shoulder is moved into a position opposite the detents so as to release the detents from locking engagement with the second shoulder. The coil spring acting between the valve body and valving element then urges the valving element toward its second position, so that upon release of the detents from locking engagement with the second shoulder, the valving element is moved to its second position to cause the second shoulder to force the detents into locking engagement with the first shoulder and the second retaining wall to move into a position opposite the detents, and thus hold the detents in locking engagement with the first shoulder, and thereby relock the valving element and piston for longitudinal movement with one another.

In the preferred and illustrated embodiment of the invention, the second shoulder and second retaining wall are provided on the inner diameter of a sleeve which is disposed about the outer part of the valving element and longitudinally reciprocable within the valve body between first and second positions. A third spring acts between the valve body and sleeve to yieldably urge the sleeve toward its second position, and the spring for urging the piston to its second position acts between the piston and the sleeve. This preferred construction enables the stem to be manipulated to shift the valving element from its second position to its first position and thus dispose detents opposite the first shoulder so as to release them from locking engagement with the first shoulder. With the detents so released, the coil spring for urging the valving element toward its second position prevents it from returning to its first position as the sleeve moves back toward its first position to cause the locking shoulder thereon to force the detents into locking engagement with the shoulder on the part carried by the piston, and then dispose the retaining wall on its inner diameter opposite the detents to hold them in locking engagement, and thus relock the valving element and piston when the sleeve has been returned to its first position.

In accordance with another novel aspect of the present invention, the piston includes an enlarged diameter portion longitudinally reciprocable within an enlarged diameter cylinder portion of the valve body, and a reduced diameter portion longitudinally reciprocable within the reduced diameter of cylinder portion thereof. A recess is provided about the enlarged cylinder portion at its intersection with the reduced cylinder portion, and the port in the valve body connects with the reduced cylinder portion on the outer side of a first groove about the reduced piston portion for receiving a first seal ring adapted to sealably slide within the reduced cylinder portion. More particularly, the enlarged piston portion has second and third longitudinally spaced grooves about it each to receive second and third seal rings, respectively, for sealably sliding within the enlarged cylinder portion.

The third groove is so located that when the third seal ring is received therein, it remains sealably engaged with the enlarged cylinder portion during reciprocation of the piston between its first and second positions. Thus, in the absence of the first and second seal rings, the piston is urged from its second toward its first position by a relatively large force due to the pressure of the second fluid acting over the third seal ring, whereby it is possible to reset or move the valving element toward its first position automatically in response to the rise in the pressure of the second fluid above a predetermined level.

The second groove about the enlarged cylinder portion is so located that when the second seal ring is received therein, it is disposed within the recess when the piston is in its second position, so that with a first seal ring received within the first groove, the piston is initially urged from its second toward its first position by a relatively small force due to the pressure of the second fluid acting over the first seal ring, which is normally not sufficient to automatically return the valving element to its second position. Consequently, it can be so moved only by manipulation of the stem.

However, when the first seal ring on the reduced diameter portion of the piston is moved out of sealing engagement with the reduced cylinder portion, the second seal ring moves out of the recess and into sealing engagement with the enlarged cylinder portion. Thus, following initial manipulation of the stem, the pressure of the second fluid is effective over the larger diameter of the second seal ring so as to provide a relatively large force for moving the piston into and maintaining in its second position, without the necessity of further manipulation of the stem. On the other hand, when the piston is returned from its second to its first position, and the first seal ring begins to move into sealing engagement with the reduced diameter of the cylinder portion, a pressure lock within the valve body chamber is avoided by virtue of the fact that the second seal ring has moved out of sealing engagement with the enlarged diameter cylinder portion and into the recess in the cylinder.

In the drawings, wherein like reference characters are used throughout to designate like parts:

Figure 3:
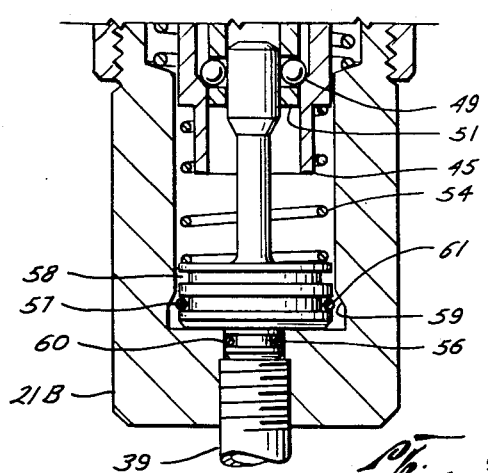
FIG. 3 is a sectional view of part of the valve, similar to FIG. 2, but upon continued lowering of the piston into its second position.
Figure 6:
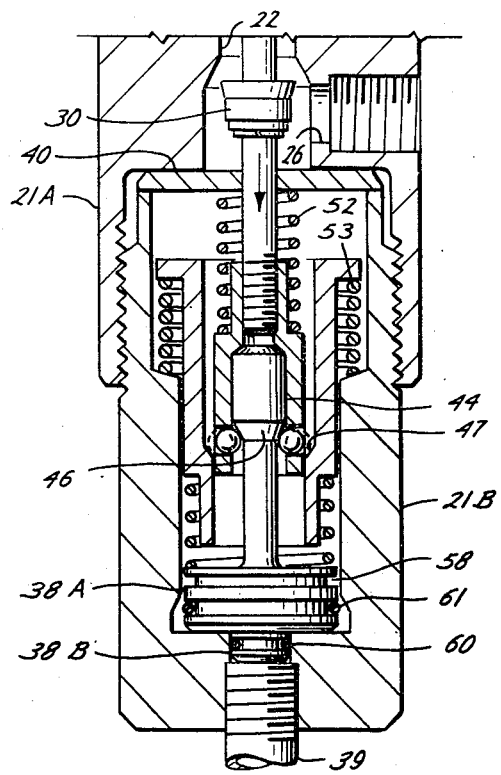
Figure 7:
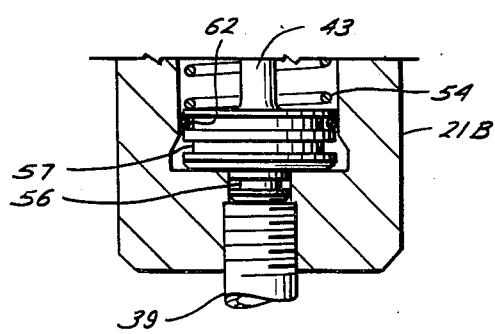

FIG. 6 is still another partial sectional view of the valve, but upon lowering of the stem to shift the valving element and sleeve downwardly from the position of FIG. 3 in order to release the detents from locking engagement with the sleeve; and FIG. 7 is a still further partial sectional view of the valve, but showing a modified piston which is adapted to be moved upwardly automatically in response to a rise in the pressure of the second fluid above a predetermined level.

Figures 1, 2:
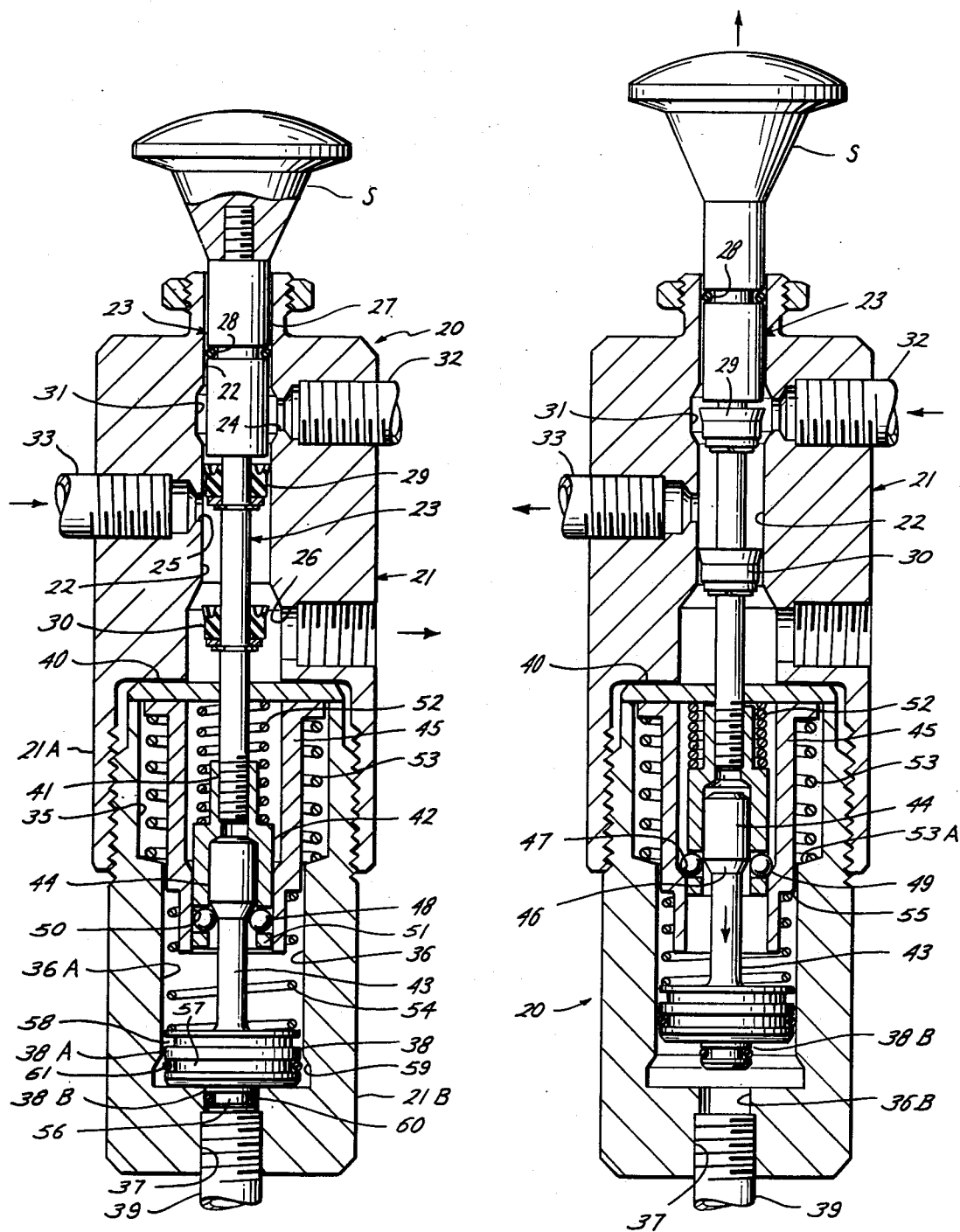
FIG. 1 is a vertical sectional view of a valve constructed in accordance with the present invention, with the valving element and piston in their second positions and releasably locked for longitudinal movement with one another.
FIG. 2 is a view similar to FIG. 1, but upon lifting of the stem to shift the valving element to its first position in order to release the piston from locking engagement of the valving element, and showing the piston lowered a distance sufficient to force the detents into locking engagement with the sleeve.

With reference now to the above-described drawings, the overall valve, which is indicated in its entirety by reference character 20, is best shown in each of FIGS. 1 and 2 to comprise a valve body 21 having a longitudinal bore 22 therein, and a valving element 23 longitudinally reciprocable within the bore. More particularly, there are ports 24, 25 and 26 formed in the valve body to intersect with the bore 22, and the valving element is reciprocable between the lower first position of FIG. 1, in which it connects ports 25 and 26 while blocking off port 24, and the upper second position of FIG. 2, in which it connects bores 24 and 25 while blocking off bore 26.

More particularly, the valving element 23 includes an enlarged diameter portion 27 at its upper end which fits closely within the bore 22 and carries a seal ring 28 thereabout for sliding within the bore above the intersection of port 24 therewith in both positions of the valving element. The valving element also includes a reduced diameter lower end having cup-shaped seal rings 29 and 30 carried thereabout each for sealably sliding within bore 22 in one of the alternate positions of the valving element. Thus, in the first position shown in FIG. 2, seal 29 sealably engages the bore intermediate the intersection of ports 24 and 25 therewith, while seal ring 30 is disposed beneath the bore. On the other hand, in the second position of the valving element, seal 30 sealably engages the bore intermediate the intersection of ports 25 and 26 therewith, while seal 29 is disposed within a radially enlarged portion 31 adjacent the intersection of port 24 therewith. Consequently, in the first position of the valving element, port 24 is blocked off by means of seal rings 28 and 29, while ports 25 and 26 are connected with one another beneath seal ring 29, and, in the second position of the valving element, ports 24 and 25 are connected with one another intermediate seal rings 28 and 30, while port 26 is blocked off beneath seal ring 30.

The upper end 27 of the valving element extends through the open upper end of bore 22 to connect with a stem S. Thus, the stem provides an external part which may be manipulated by hand to shift the valving element between its alternate positions.

In a typical use, such as that previously described, a conduit 32 leading from a first fluid source may be connected to port 24, and a conduit 33 connected with the outer end of port 25 may lead to a diaphragm type operator for a safety valve. No conduit is connected with port 26, however, inasmuch as the latter port serves as a vent in this use of the valve. Thus, with the valving element in the second position of FIG. 2, second fluid from the above-described source is confined for flowing into conduit 33 leading to the safety valve operator. On the other hand, when the valving element is lowered to its first position, conduit 32 is blocked off, and the second fluid admitted to the safety valve operator is free to be exhausted from conduit 33 into the vent provided by port 26.

The valve body 21 includes a portion 21A in which bore 22 and ports 24, 25 and 26 are formed, and a portion 21B threadedly connected to portion 21A at 34 to provide a chamber 35 at the end of the bore opposite stem S. Chamber 35 includes a cylinder 36 having enlarged and reduced diameter portions 36A and 36B, respectively, and a port 37 in the lower end of valve body portion 21B intersecting with the lower end of reduced diameter cylinder portion 36B.

Piston 38 reciprocable within the cylinder includes an enlarged diameter portion 38A sealably slidable within cylinder portion 36A and a reduced diameter portion 38B sealably slidable within cylinder portion 36B. A conduit 39 connects with the outer end of port 37 so as to admit a second fluid into the cylinder 36 beneath the piston 38 in order to provide a force urging the piston in an upward direction. In the contemplated use of the valve, this conduit may connect with the same source of fluid from which conduit 32 leads.

The lower end of the reduced diameter portion of valving element 23 is guidably slidable within a hole through a plate 40 held between the upper and lower portions 21A and 21B of the valve body for threaded connection at 41 to a tubular part 42. A rod 43 extend upwardly from the upper side of piston 37 and has an enlarged part 44 on its upper end which fits closely within tubular part 42 of the valving element, when part 44 is so fitted within tubular part 42, its upper end abuts with the part 42 so that when piston 38 is in its lower second position, the valving element is also located in its second position.

A sleeve 45 disposed about the valving element is longitudinally reciprocable within the valve body chamber 35 between a first upper position, as shown in FIGS. 1, 2, 3 and 5, and a second lower position, as shown in FIG. 7. An external flange on the upper end moves within an enlarged portion of the chamber above cylinder 36, and the outer diameter is closely received within the enlarged cylinder portion 36A. The lower reduced diameter end of the inner diameter of the sleeve is closely received about the outer diameter of tubular part 42 of the valving element.

A downwardly facing shoulder 46 which is formed at the intersection of rod 43 and part 44 tapers downwardly and inwardly with respect to the axis of the piston. An upwardly facing shoulder 47 which is formed at the intersection of the upper enlarged and lower reduced inner diameter portions of the sleeve 45 tapers downwardly and inwardly, and thus oppositely to the shoulder 46, at the same angle as shoulder 46. A series of holes 48 are formed in the lower end of tubular part 42, and a ball detent 49 is carried in each for lateral shifting therein between an inner position beneath shoulder 47 on the sleeve. Thus, each ball detent is of a diameter greater than the thickness of tubular part 42, and preferably of a diameter approximating the thickness of tubular part 42 plus the radial extent of each of the shoulders 46 and 47.

With each of the valving element and piston in its lower second position, and the sleeve 45 in its upper first position, as shown in FIG. 1, ball detents 49 are held in locking engagement with shoulder 46 by means of a retaining wall 50 formed by the inner diameter of the lower end of sleeve 45 which fits closely about the outer diameter of tubular part 42. On the other hand, with valving element 23 raised to its upper first position, as shown in FIG. 3, ball detents 49 are held in locking engagement with shoulder 47 by means of a retaining wall 51 formed by the outer diameter of part 44 which fits closely within the inner diameter of tubular part 42.

A coil spring 52 is disposed about the valving element within chamber 35 intermediate the upper end of tubular part 42 and the lower side of plate 40, so that when the piston 38 is in its lower second position, tubular part 42 is yieldably urged into a fitted position over part 44 to locate valving element 23 in its second position. Sleeve 45, on the other hand, is yieldably urged into its upper first position, in which its upper end is engaged with the lower side of plate 40, by means of a coil spring 53 disposed about the sleeve and acting between the external flange on its upper end and a shoulder 54 formed by the intersection of cylinder 36 with the upper enlarged portion of the chamber 35. Piston 38 is yieldably urged to its lower second position by a coil spring 54 disposed about the rod 43 of the piston and a lower extension of the sleeve and acting between a downwardly facing shoulder 55 on the sleeve and the upper side of piston 38, so that with the sleeve 45 in its first upper position, coil spring 54 in effect acts between the valve body and the piston.

As will be understood from the foregoing, unless moved upwardly by a force due to the pressure of the second fluid, or shifted upwardly by lifting of the stem S, the valving element 23 is held in its lower second position by means of the spring 52. Furthermore, sleeve 45 is normally held in its first upper position by means of the sleeve 43, so that, under these conditions, the valving element and piston are disposed in their lower positions so as to block off a first fluid within conduit 32 and permit the first fluid from the valve operator to be vented from conduit 23 into port 26.

As will be described to follow, since the valving element and piston are locked for longitudinal movement with one another, the upward movement of one will raise the other. As will be described to follow, this may occur automatically in the event the piston is modified, as shown in FIG. 7, and the pressure of the second fluid within conduit 39 rises above a predetermined level. In any event, the piston 38 will be raised with the valving element 23 in the event the stem S is manipulated to shift the valving element upwardly.

Upon upper movement of the valving element and piston with one another, ball detents 49 will move into the position shown in FIG. 2 in which they are opposite the shoulder 47 on the inner diameter of the sleeve 45. This, of course, releases the detents from locking engagement with shoulder 46, to permit the part 44 on the upper end of the piston to be moved downwardly under the urging of spring 54. As part 44 moves downwardly, the shoulder 46 thereabout cams the detents outwardly into locking engagement with shoulder 47, and the retaining wall 51 thereabout moves into a position opposite the detents, as shown in FIG. 2, so as to hold them in locking engagement with the shoulder on the sleeve, thereby locking the valving element against downward movement back to its second position, irrespective of the fact that the pressure of the second fluid may be very low.

Assuming that the pressure of the second fluid is sufficiently low that the spring 54 moves the piston all the way down into its second position, as shown in FIG. 3, the reduced diameter portion 38B fits slidably into the reduced cylinder portion 36B of the cylinder 36. The area of the piston over which the second fluid is effective will depend upon the arrangement of the seal rings carried by the piston. Thus, as shown, the piston has a first groove 56 about the reduced diameter piston portion, and second and third grooves 57 and 58 about the enlarged diameter portion thereof. Furthermore, cylinder 36 is recessed at 59 at the lower end of the enlarged portion 36A thereof. In the construction of the piston shown in FIGS. 1 to 6, a seal ring 60 is received within groove 56 and a seal ring 61 is received within groove 57 opposite the recess 59 so that it is not sealably engaged with the cylinder. Thus, the second fluid is effective over the smaller diameter of seal ring 60 to produce only a relatively small upward force, as compared to the force the second fluid would produce if seal rings 60 and 61 were removed, and a seal ring 62 installed within groove 58 for sealably engaging cylinder portion 36A, as shown in FIG. 7. In any event, however, with the piston released from the valving element, its upward movement is resisted only by the force of the spring 54. Still further, the force of spring 54 is relatively small since the sleeve is in its upper position and the piston is in its lower position, so that even the smaller upward force due to the pressure of the second fluid will normally be sufficient to raise the piston from the position of FIG. 3 to the position of FIG. 4. Then, as the seal ring 61 of the piston shown in FIGS. 1 to 6 moves out of cylinder portion 36B, seal ring 61 moves into engagement with enlarged cylinder portion 36A. Consequently, as the spring 54 is compressed to increase its resistance to upward movement of the piston, additional upward force is exerted on the piston due to the fact that the second fluid is acting over the cross-sectional area of the seal ring 61. Consequently, the force is ordinarily sufficient to move the piston all the way up to its first position, as shown in FIG. 5, in which part 44 fits within part 42 to prevent further upward movement of the piston.

Figure 4:
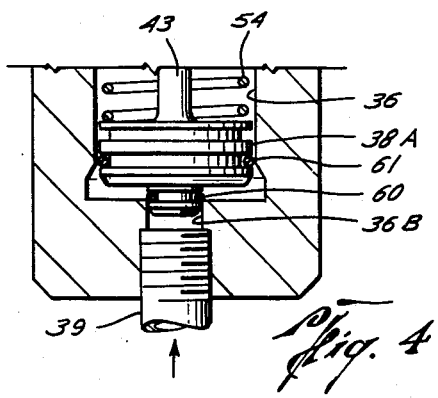
FIG. 4 is a sectional view of the valve, similar to FIG. 3, but upon movement of the piston upwardly toward its second position due to the pressure of the second fluid acting over the lower end of the piston.
Figure 5:
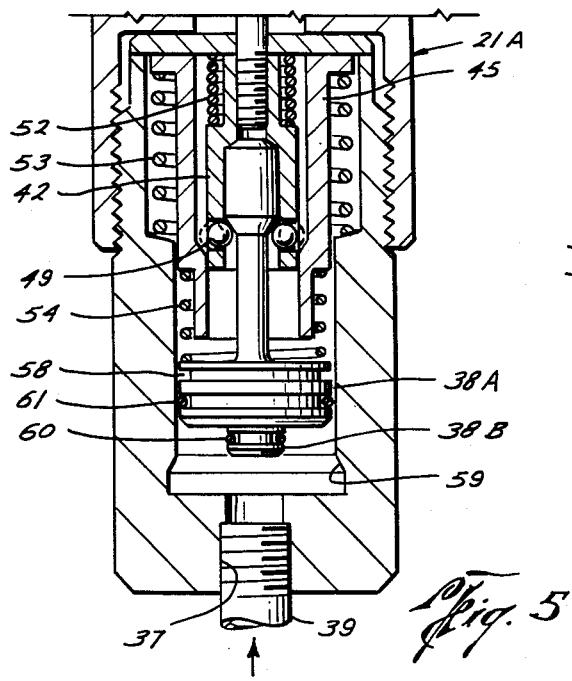
FIG. 5 is a partial sectional view of the valve, similar to FIG. 3, but upon continued upward movement of the piston to its first position so as to release the detents from locking engagement with the sleeve.

Obviously, if the pressure of the second fluid is sufficient to move the piston of FIGS. 1 to 6, from the position of FIG. 3 to the position of FIG. 4, as previously described, it will be sufficient to move the modified piston of FIG. 7 a corresponding distance and then all the way up to its first position, as shown in FIG. 5.

When part 44 moves upwardly to fit within tubular part 42, shoulder 46 thereon moves opposite the ball detents 49 to release them from locking engagement with shoulder 47 on the valving element, and thus release the valving element for movement downwardly with respect to the sleeve to its second position due to the combined urging of coil springs 52 and 54. As the valving element moves downwardly, due to a drop in the pressure of the second fluid below the predetermined level, shoulder 47 thereon cams the detents inwardly into locking engagement with the locking shoulder 46 at the lower end of part 44. Thus, tubular part 42 is free to move downwardly within the lower extension 55 of sleeve 45 so that the detents move back within the retaining wall 50 of the sleeve, thereby relocking the piston and valving element for longitudinal movement with one another.

As previously described, the valving element and piston may be relocked by manipulation of the stem to shift the valving element downwardly from the position of FIG. 3 to the position of FIG. 6. As the valving element is so moved, the locking engagement of ball detents 49 with locking shoulder 47 on sleeve 45 will move the sleeve downwardly with the valving element until the tubular part 42 on the lower end of the valving element is fitted over part 44 on the upper end of the piston. As a consequence, the ball detents are moved into a position opposite shoulder 46 to release them from locking engagement with locking shoulder 47. Since the force due to the coil spring 53 is greater than that due to coil spring 52, the released sleeve moves upwardly to cause locking shoulder 47 to cam the detents inwardly into locking engagement with locking shoulder 46 and then move the retaining wall 50 into position about the ball detents, as shown in FIG. 1, to thereby relock the valving element and piston.

Although the piston shown in FIGS. 1 and 6 will ordinarily move automatically upwardly from the FIG. 3 to the FIG. 4 position in response to the pressure of the second fluid, it is not intended to be automatically lifted from its FIG. 1 position. Thus, in the FIG. 1 position, as compared with the FIG. 3 position, upward movement of the piston is resisted not only by the force of coil spring 54, but also by the force of coil spring 52 which urges the valving element into its second position. On the other hand, when the modified piston of FIG. 7 is used, the upward force on the piston due to the pressure of the second fluid is, as previously described, much greater so as to permit the valving element to be moved downwardly to its second position automatically in response to a rise in the second fluid above a predetermined amount, without the necessity of lifting the stem S.

From the foregoing it will be seen that this invention is one well adapted to attain all the ends and objects hereinabove set forth, together with the other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a body having a bore extending longitudinally therein and lateral ports connecting with the bore at longitudinally spaced locations, a valving element longitudinally reciprocable within the bore between first and second positions, said valving element having longitudinally spaced seal rings thereabout sealably slidable within the bore for controlling the flow of a first fluid between the lateral ports in each of said positions, said body having a chamber at one end of the bore including a cylinder having an inner enlarged diameter portion, an outer reduced diameter portion disposed coaxially of the bore and a circumferential recess at the intersection of the enlarged and reduced portions, a piston longitudinally reciprocable within the cylinder between first and second positions, means connecting the valving element to the piston for longitudinal movement therewith between its first and second position, said piston including an enlarged diameter portion longitudinally reciprocable within the enlarged diameter cylinder portion and a reduced diameter portion longitudinally reciprocable within the reduced diameter cylinder portion, said reduced piston portion having a first groove thereabout to receive a first seal ring for sealably sliding within the reduced cylinder portion said body having a port therein connecting with the reduced cylinder portion on the outer side of the first seal ring thereabout, said enlarged piston portion having second and third longitudinally spaced grooves thereabout each to receive second and third seal rings, respectively, for sealably sliding within the enlarged cylinder portion, the third groove being so located that when the third seal ring is received therein, it remains sealably engaged with the enlarged cylinder portion during reciprocation of the piston between its first and second positions, whereby, in the absence of said first and second seal rings, the piston is urged from its second toward its first position by a force due to the pressure of the second fluid acting over the third seal ring, and the second groove being so located that when the second seal ring is received therein, it is disposed within said recess when the piston is in its second position, but moves into sealing engagement with the enlarged cylinder portion when the first seal ring moves out of sealing engagement with the reduced cylinder portion, whereby, in the absence of said third seal ring, the piston is initially urged from its second toward its first position by a force due to the pressure of the second fluid acting over the first seal ring and then by a force due to the pressure of said second fluid acting over the second seal ring.

* * * * *